Jan. 7, 1958     J. A. BARGER     2,818,665
ANIMAL EAR TAG
Filed June 21, 1954     2 Sheets-Sheet 1
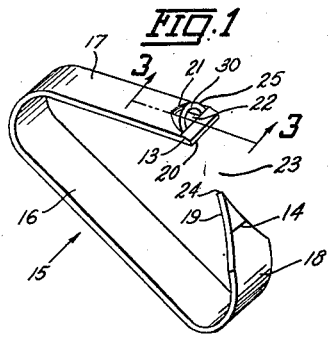
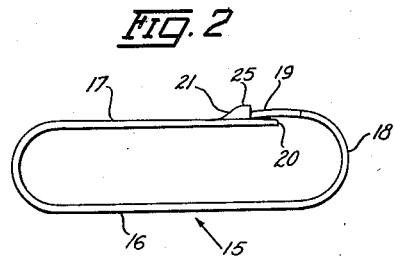
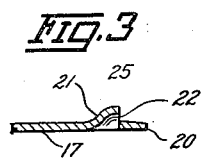
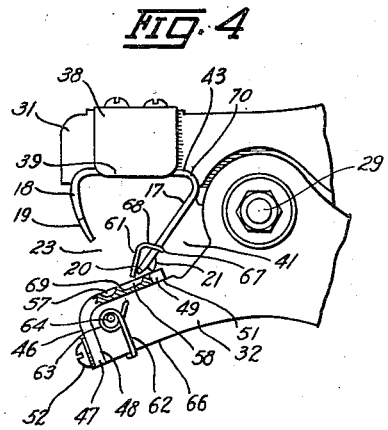
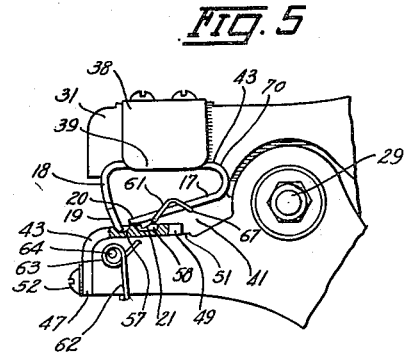
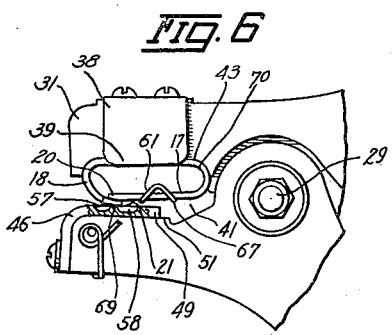
INVENTOR.
JOHN A. BARGER
BY *Rudolph L. Lowell*
ATTORNEY.

Jan. 7, 1958                J. A. BARGER                2,818,665
                            ANIMAL EAR TAG
Filed June 21, 1954                              2 Sheets-Sheet 2
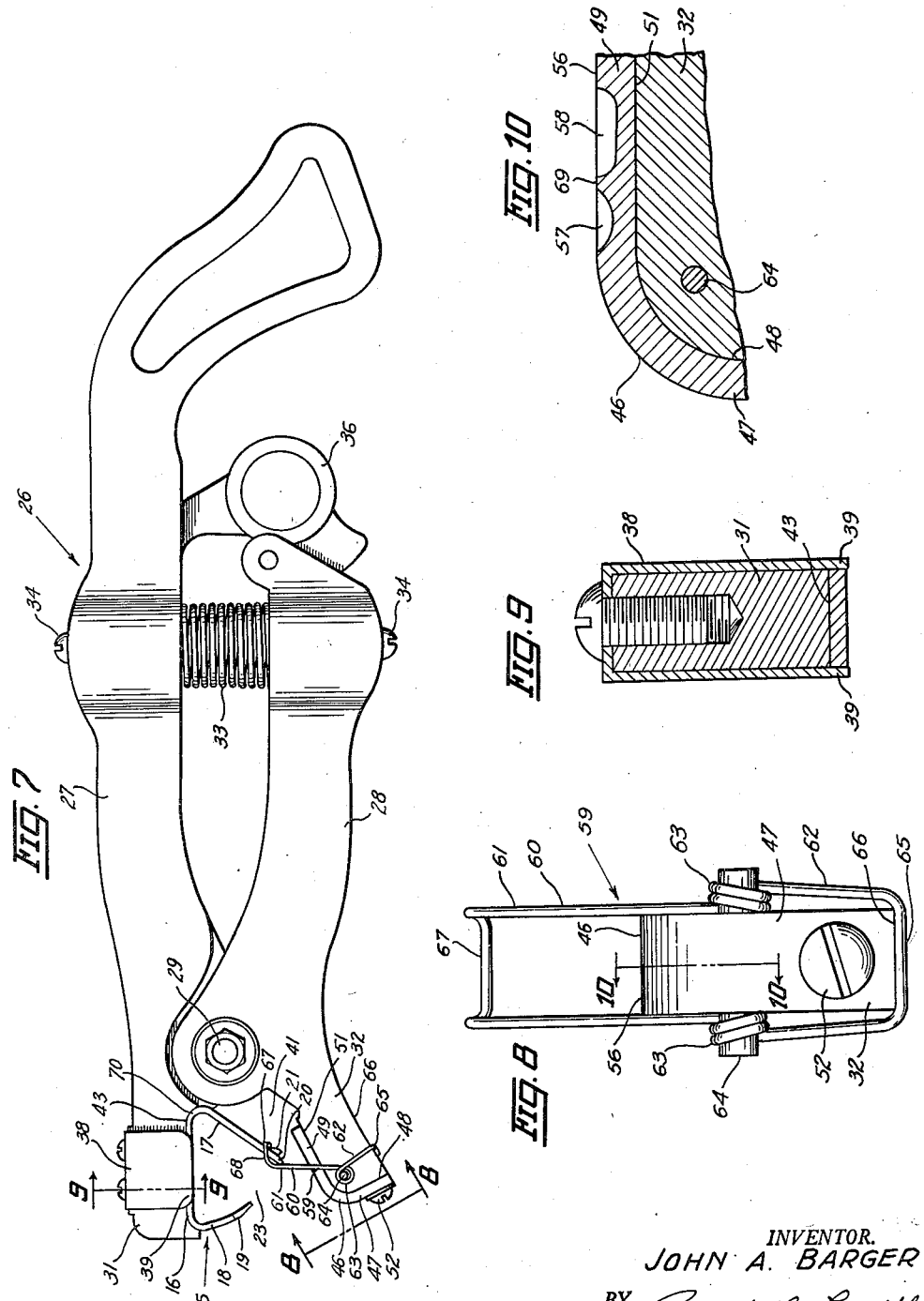
INVENTOR.
JOHN A. BARGER
BY Rudolph L. Lowell
ATTORNEY.

United States Patent Office 2,818,665
Patented Jan. 7, 1958

2,818,665

ANIMAL EAR TAG

John A. Barger, Pass Christian, Miss.

Application June 21, 1954, Serial No. 438,006

2 Claims. (Cl. 40—3)

This invention relates generally to animal ear-tagging devices and in particular to a tag for attachment to the ears of livestock.

The tagging of ears of livestock for identifying registered stock or for marking stock which has been given preventative treatments or tests against certain diseases prescribed by state health officials is a common practice. Although the tags now used for these purposes are generally satisfactory, many of them do not pierce the ear cleanly, or are pressed into the ear so that serious infections often times result.

Another objection to many of these tags is that they are not completely closed, when in a secured position on an animal's ear, so that they are often caught on surrounding objects, in the normal habits of an animal, so as to become loosened and then lost, or are torn out from the animal's ear with resulting damage to the ear.

It is an object of this invention, therefore, to provide an improved animal ear tag.

A further object of this invention is to provide an ear tag which is completely closed on an animal's ear and locked in a closed position with complete elimination of any projecting portions that could be caught on surrounding objects.

Still another object of this invention is to provide an ear tag for an animal which is capable of cleanly piercing an ear, and of being easily and quickly secured on an ear without pressing against or into the ear.

Further objects, features and advantages of this invention will become apparent from the following description when taken in connection with the accompanying drawings, in which:

Fig. 1 is an enlarged perspective view of an animal ear tag of this invention shown in open position;

Fig. 2 is a side elevational view of the tag of Fig. 1 shown in closed position;

Fig. 3 is an enlarged sectional detail view taken along the line 3—3 in Fig. 1;

Figs. 4, 5 and 6 are fragmentary side elevational views of the jaws, for the tagging device shown in Fig. 7, illustrated in changed positions to show the closing of the tag therebetween, and with certain parts broken away and shown in section to more clearly disclose the action of the jaws on the tag;

Fig. 7 is a side elevational view of a tagging device for securing the tag shown in Fig. 1 in an animal's ear, with a tag being illustrated in an open position therein;

Fig. 8 is an enlarged sectional view taken substantially along the line 8—8 in Fig. 7;

Fig. 9 is an enlarged sectional detail view as seen along the line 9—9 in Fig. 7; and Fig. 10 is a detail sectional view as taken along the line 10—10 in Fig. 8.

With reference to the drawings, the animal tag of this invention, designated generally as 15, is illustrated in Figs. 1 and 4 as including a flat body member 16 formed at its opposite ends with leg members 17 and 18 which are projected laterally outwardly from a common side of the body member 16 and inclined inwardly toward each other. As best appears in Fig. 4, the leg 17 is of a generally straight form, and the leg 18 of a curved form. The leg 18 is of a shorter length than the leg 17 and is formed at its free end with a prong portion 19.

At a position spaced inwardly from its free end 20, the leg 17 is formed with a combination prong receiving and guiding member 25 comprised of an upwardly projected shell portion 21, open at its end 30 to the free end 20 of the leg 17, and arranged in a covering relation with an opening 22 extended laterally through the leg member 17 (Figs. 1 and 3). By virtue of the legs 17 and 18 being of relatively different lengths, when the tag member 15 is in its open position shown in Figs. 1 and 7, there is provided a space or opening 23 between the free ends 19 and 20 thereof for the insertion of an animal's ear therebetween and within the tag 15.

In closing the tag 15, the leg member 17 (Fig. 2) is initially bent inwardly into a plane substantially parallel with the plane of the body member 16, after which the short leg member 18 is bent inwardly such that the prong portion 19 thereof overlies the free end 20 of the long leg 17 by an amount such that the prong 19 is received within the shell 21 with the point 24 on the prong 19 within the opening 22.

To facilitate closing of the tag 15, the free end 20 of the leg 17 is formed on its outer side with a five to ten degree bevel, indicated at 13, for guiding the prong 19 toward the shell 21. Bending of the prong 19 for reception within the shell 21 during a closing of the tag, is facilitated further by the provision of a score or transverse cut 14 on the outer side of the prong 19 at a position adjacent to the point 24 thereof.

As a result of this relative closing action of the legs 17 and 18, it is seen that the tag 15 is of a substantially elliptical shape wtih the free end 20, of the leg 17, covered or protected by the prong 19, and with the prong 19 in turn being protected and covered by the combination prong guiding and receiving member 25. The tag is thus entirely free of any sharp projections which might be caught on surrounding objects by an animal during its normal habits, and the prong 19 and end 20, of the leg member 17, are in substantially parallel planes and entirely free of being pressed into an animal's ear which is located between the leg 17 and the body member 16.

To close the tag 15 in the manner above described there is provided an animal tagging device, designated generally at 26, (Fig. 7) and comprising a pair of levers 27 and 28 pivoted intermediate their ends at 29 such that the jaw portions 31 and 32 on the levers 27 and 28, respectively, are moved toward each other in response to the movement of the levers 27 and 28 away from each other. This opening movement is accomplished by means of a coil spring 33 connected between the levers 27 and 28 by screws 34. The spring 33 is compressed between the levers 27 and 28 and held against extension by a pivoted trigger member 36. On actuation of the trigger member 36 to release the spring 33, the levers 27 and 28 are moved away from each other to in turn provide for a closing of the jaws 31 and 32. For a detailed description of this spring and lever assembly, and the action of the spring 33 to close the jaw members 31 and 32, reference is made to U. S. Patent 2,430,853.

The jaw 31 carries, in a straddling relation, a spring clip member 38, of a substantially U-shape, such that the free ends 39 of the clip member 38 project inwardly beyond the jaw 31 and into the space 41 between the jaws 31 and 32 (Figs. 7 and 9). The inner side 43 of the jaw member 31 is of a size and shape corresponding substantially to the size and shape of the body member 16 of the tag 15 so as to receive the body member 16 thereon in releasable frictional engagement between the clip ends 39. In this positioning of the tag 15, the long leg 17 is arranged adjacent to the pivot 29 so that the short leg 18 is positioned forwardly on the jaw 31 and with both legs 17 and 18 projected within the jaw space 41.

The jaw 32 (Fig. 7, 8 and 10) is provided with an anvil member 46 of a generally L-shape having its short leg 47 positioned over the front side 48 of the jaw 32 and its long leg 49 positioned against the inner side 51 of the jaw 32. The anvil 46 is secured in this assembly position by a screw 52 extended through the short leg 47 and threaded within the jaw 32.

The inner surface 56 of the long leg 49 of the anvil 46 (Fig. 10) is formed with a pair of longitudinally spaced but closely adjacent cavities 57 and 58, with the cavity 57 being of a generally circular form, and the cavity 58 of a generally oval form extended longitudinally of the leg 49. The cavities 57 and 58 function as a guide means for the free ends 19 and 20 of the tag leg members 18 and 17, respectively, for bending these leg members in a predetermined pattern, as will later appear.

A torsion spring, indicated generally at 59 (Figs. 7 and 8), is of a closed type integrally formed with a first U-shape portion 61 and a second U-shape portion 62 having their free ends terminating in spring coils 63 which are mounted about a pin 64 extended transversely through the jaw member 32. The spring U-shape portion 62 is arranged in a straddling relation with the jaw 32 such that its base or leg connecting portion 65 is engageable with the outer side 66 of the jaw 32. The U-shape portion 61 of the spring 59 is arranged in a straddling relation with the jaw 32 such that the legs 60 of the portion 61 are projected upwardly from the jaw 32 at oppositely arranged transversely spaced positions so that the base or leg connecting portion 67 is spaced upwardly from the inner surface 56 of the anvil leg member 49. As best appears in Fig. 7, the legs 60 of the U-shape spring portion 59 terminate in lateral extensions 68 which project in a direction toward the lever pivot 29.

With the tag 15 positioned against the jaw member 31 and releasably held by the clip 38, the free end 20 of the tag leg member 17 is positioned between the lateral extensions 68 of the spring U-shape portion 61 such that the base portion 67 engages the leg member 17 at a position inwardly of the guiding shell 21 formed on the leg 17. As a result, the tag 15 is frictionally held between the legs 39 of the clip member 38 and against the inner side 43 of the jaw 31 by the action of the spring 59.

On release of the coil spring 33 to close the jaws 31 and 32, the base portion 67 (Fig. 4) is moved inwardly of the tag leg member 17 in response to the engagement of the free end 20 of the leg member 17 by the anvil leg 49.

As the movement of the jaws 31 and 32 toward each other is continued, to their relative positions shown in Fig. 5, the shell 21 is received within the elongated cavity 58, the leg member 17 is bent inwardly to a position within the longitudinal dimensions or confines of the short leg 18, and the prong 19 on the short leg 18 is engaged by the anvil leg member 49 at the cavity 57.

With reference to Fig. 10, it is seen that the cavities 57 and 58 are separated by a relatively narrow rib or wall 69. Thus, on reception of the prong 19 within the cavity 57, and with the free end 20 of the leg member 17 extended forwardly of the rib 69, as shown in Figs. 5 and 6, the prong 19 is guided by the side wall of the cavity 57 upwardly on the rib 69 and against the beveled portion 13 on the free end 20 of the leg 17 for entrance into the shell 21. As the prong 19 enters the shell 21, it is guided thereby to provide for the location of its apex 24 within the opening 22.

This arrangement of the prong 19 relative to the shell 21 and opening 22 takes place when the leg member 17 is moved into a plane substantially parallel with the plane of the tag body member 16. It is seen, therefore, that when the tag 15 is closed it has a substantially oval shape, with the prong 19 and end 20 of the leg member 17 being in an overlapping relation, with the end 20 to the inside of the prong 19, and with the prong 19 extended within the shell 21. By virtue of the bending of the prong end 24 within the opening 22, the leg members 17 and 18 are locked together against separation, and the free end of one leg is mutually cooperative with the free end on the other leg to function as guard or shield members in eliminating any sharp projections on the tag. Stated otherwise, the tag 15 in its closed position has a substantially smooth outside contour whereby to prevent any catching of the tag on surrounding objects, when it is in a secured position on an animal's ear.

An animal's ear (not shown) in the operation of the tagging device of Fig. 7 is initially inserted through the space or opening 23 between the tag leg members 17 and 18 to a position against the junction, indicated at 70 in Fig. 7, between the tag base member 16 and leg member 17. On closing of the jaws 31 and 32, therefore, the ear is pressed against the prong 19 by the initial bending movement of the leg member 17 so that only a single piercing operation is required in securing the tag 15 on the ear. With the tag 15 secured on the ear, that portion of the ear inserted within the tag 15 is located between the leg member 17 and the tag body member 16, with the leg member 17 being free of any pressing engagement with the ear by virtue of its predetermined inward movement to a plane substantially parallel with the tag body member 16. Thus, the opposite sides of the tag 15, when the tag is in a closed position, are of a width greater than the thickness of an animal's ear so that the ear is loosely received between the leg member 17 and the body member 16.

From a consideration of the above description, it is seen that the invention provides an animal ear tag of a simple construction, adapted to be secured in place on an animal's ear in a permanent manner and with the elimination of any sharp projecting portions, or discomfort to the animal. The leg members 17 and 18 are locked together by the bending of the prong end 24 within the opening 22 so as to hold the closed tag against being opened.

Although the invention has been described and illustrated with respect to a preferred embodiment thereof, it is to be understood that it is not to be so limited since changes can be made therein which are within the full intended scope of this invention as defined by the appended claims.

I claim:

1. A tag for an animal ear tagging device comprising a flat body member having a pair of longitudinally opposite leg members thereon inclined inwardly toward each other, with one of said leg members being shorter than the other to provide an ear receiving space between the free ends thereof, an ear piercing prong formed at the free end of said short leg, with the long leg having an opening adjacent the free end thereof for receiving said prong therethrough, and an upright curved shell portion on said long leg arranged in a partial covering relation with said opening and open toward the free end of said long leg, whereby said prong, on inward movement of said legs toward each other to an initial position in which the long leg is substantially parallel to said body member, is movable over the free end of said long leg and within said shell so as to be guided thereby into said opening.

2. A tag for an animal ear tagging device comprising a flat body member having an upwardly and inwardly curved leg at one end and an upwardly and inwardly inclined leg at its other end, with said curved leg being shorter than the inclined leg and formed at its free end with an ear piercing prong portion, and said inclined leg having a combination prong guiding and receiving portion adjacent the free end thereof, said prong guiding and receiving portion including an upright curved shell portion and an opening formed in said inclined leg, said shell portion covering said opening and having an open end which faces and is spaced inwardly from the free end of said inclined leg, so that on initial inward bending movement of said long inclined leg into a plane substantially parallel to the plane of said body member, said combination portion is arranged opposite an intermediate portion of said body member and said curved leg is bendable inwardly to position said prong over the free end of said inclined leg and within said combination portion to close the tag.

References Cited in the file of this patent

UNITED STATES PATENTS

| | | |
|---|---|---|
| 1,368,628 | Hawley | Feb. 15, 1921 |
| 1,478,605 | Fretz | Dec. 25, 1923 |
| 1,882,378 | Ashton | Oct. 11, 1932 |
| 2,087,295 | Pannier | July 3, 1937 |